Aug. 7, 1951 V. F. ZAHODIAKIN 2,563,667
PISTON RING.
Filed July 25, 1947 2 Sheets-Sheet 1
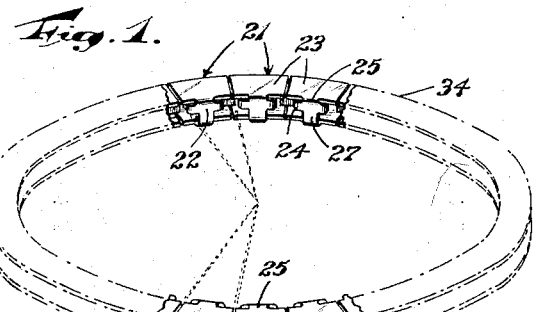
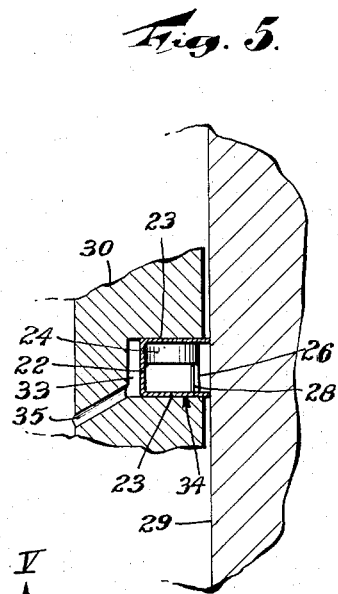
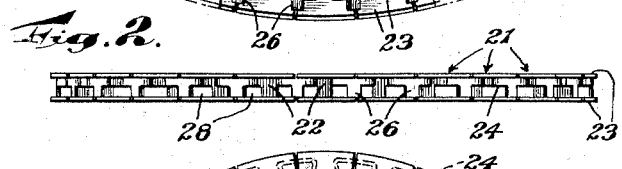
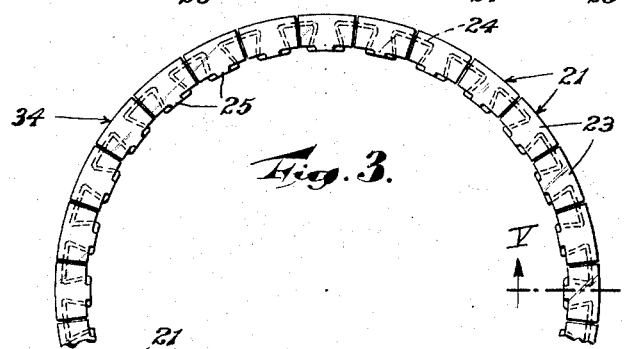
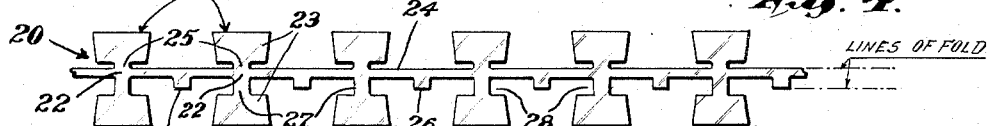
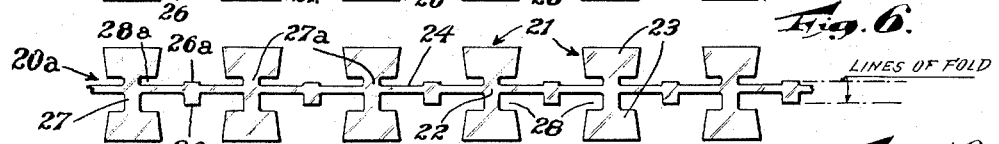
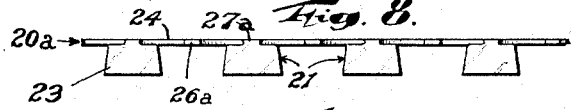
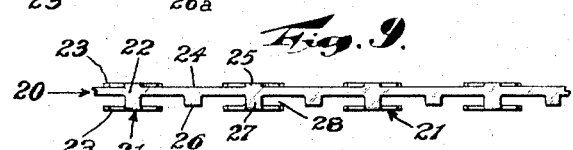
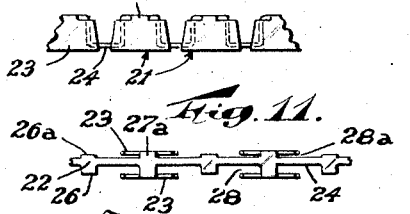
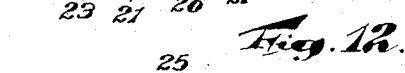
INVENTOR
VICTOR F. ZAHODIAKIN.
BY
Howard P. King
ATTORNEY Aug. 7, 1951 — V. F. ZAHODIAKIN — 2,563,667
PISTON RING
Filed July 25, 1947 — 2 Sheets-Sheet 2

INVENTOR
VICTOR F. ZAHODIAKIN.
BY Howard P. King
ATTORNEY

Patented Aug. 7, 1951

2,563,667

UNITED STATES PATENT OFFICE 2,563,667

PISTON RING

Victor Filippovich Zahodiakin, Short Hills, N. J.

Application July 25, 1947, Serial No. 763,606

5 Claims. (Cl. 309—45)

This invention relates to improvements in oil control rings and such rings adapted to be used on pistons of internal combustion engines and the like, and is an improvement upon the ring of my prior Patent 2,397,636 of April 2, 1946. This type of ring can be used successfully on steam engines, pumps and similar machines where excessive escape of oil around the cylinder wall past the piston must be prevented.

The present invention is embodied in a self-expanding piston ring formed from a sheet or strip of resilient material, preferably high carbon steel. The ring shown consists of two relatively narrow parallel cylinder-contacting and sealing ledges each composed of an annular series of a multiplicity of sector-like sections or crowns the sides of which are disposed on radial lines, the successive sectors or crowns being adjacent each other in close proximity to prevent escape of excessive amount of oil. Corresponding sectors of the two ledges will be referred to as a pair. Successive pairs of sectors are integrally connected and arranged in such a way that outward pressure toward the outer arcuate edges of the sectors is generated with the result that the narrow contacting edge surfaces of the several crowns are in constant contact with the cylinder wall.

Another advantage of the invention is to provide an oil control ring for the purpose of scraping and control of oil in such a way that reciprocation of the ring and friction which is generated by the contacting scraping edges of the ledges will not cause the sectors or crowns to deflect from the general plane of the ledge and thereby avoid circumstances which would tend toward breakage of the crowns and result in serious damage to the engine. Brittleness of the metal increases with hardness, and bending of the sectors in use and breakage at the bend could easily occur when hardness of the ring reaches in excess of 50 Rockwell, Scale C. Normally, to obtain great durability of a piston ring at its wear surface, it is desirable to harden the ring to 58–62 Rockwell, Scale C, and according to the present invention this desideratum may be attained and breakage prevented by provision of vertical support between ledges at the sides of the sectors or crowns, said supports being incorporated in all the loops which integrally connect successive pairs of crowns.

Congruent with the foregoing, an object of the invention is to provide an oil control ring for a piston which is adapted to conform to any irregularity of the cylinder bore and thereby obtain maximum performance for the purpose intended.

A further object of the invention is to provide a flexible oil control ring which easily conforms to localized irregularities or distortions such as usually occur in the cylinder bores when the engine begins to operate and temperature rises.

Another object of the invention is to make an oil control ring having the features specified, from a single strip of metal by cutting, forming and folding the strip to a completed article.

An important object of this invention is to provide a flexible oil control ring which will be capable to control oil not only by the narrow projecting parallel surfaces or ledges, but also by provision of oil-trapping and controlling chambers formed in the ring.

Another important advantage derived by this invention is to provide a flexible oil control ring which mainly permits lubrication of cylinder walls on the upward or compression stroke of the piston and permits a minimum lubrication on the downward stroke of the piston.

Yet another object of this invention is to decrease dilution of lubricating oil by fuel mixture on the intake stroke whereby the performance of the engine will be enhanced and the life of the engine increased.

Still another object of the invention is to provide an oil control ring for universal application where high and low speed may be relatively balanced in oil economy.

A general object of the invention is to control oil economy by a flexible piston ring by means of loops and crowns and crown supports having proper relation to the crowns both for trapping and partial escape of oil, and for engines which operate usually at various speeds, such as automobile engines, to provide a partial escape for oil different for up and down strokes.

A specific object of the invention is to provide a flexible ring with loops, crowns and crown supports without undercuts next the upper ledge for reducing oil escape on the downward stroke to obtain operating conditions more ideal for high-speed engines or constant speed engines, such as aircraft engines, power plants, Diesel engines, gasoline engines, steam engines and the like.

Of like nature, an object of the invention is to provide a flexible oil control ring formed from sheet steel as sectioned ledges with loops between the ledges connecting pairs of sectors thereof and providing oil passages throughout the entire lengths of the loops next the bottom ledge with exception of a small circumferential portion in each loop which forms a single vertical support for successive adjacent sections of the bottom ledge of the ring.

Other objects and advantages of the invention will appear to those versed in the art to which it appertains as the description thereof proceeds both by direct recitation thereof and by implication from the context.

Referring to the accompanying drawings in which like characters of reference indicate similar parts throughout the several views:

Figure 1 is a perspective view of a ring in accordance with the present invention;

Figure 2 is a side elevation of the piston ring shown in Fig. 1;

Figure 3 is a fragmentary top plan of the ring;

Figure 4 is a plan of the prepared blank or basic structure of the ring prior to any bending thereof;

Figure 5 is a sectional view of a portion of a cylinder and piston and cross-section of a ring of the present invention associated therewith in the piston ring groove;

Figure 6 is a plan similar to Fig. 4 but illustrating a modified form of blank;

Figure 8 is a plan showing partial folding of the ring of Fig. 6, namely, folding of the sectors with respect to the back-bone;

Figures 9 and 11 are edge views of structures partially folded as in Fig. 8 and showing the structures of Figs. 5 and 6 respectively in their said partially folded condition;

Figure 10 is a similar plan wherein the backbone has been partially folded in the initial loop-forming operation;

Figure 12 is a plan of partially completed ring strip as shown in Fig. 8 being further bent to complete the loops and to produce a circular ring.

Figure 13:
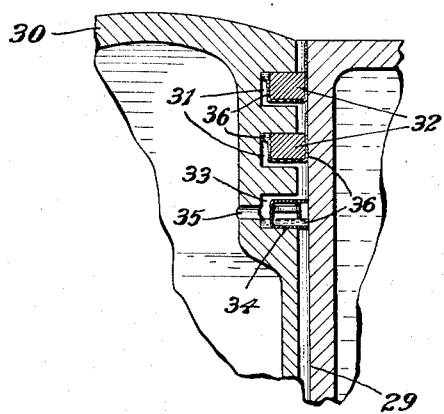
Figures 13–16 are views similar to Fig. 7, but very considerably exaggerated as to oil spaces for showing the location and action of the oil at different piston-stroke positions.
Figure 14:
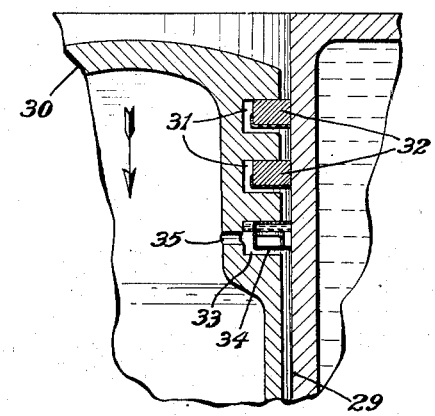

In the specific embodiment of the invention illustrated in said drawings, and in terms of description of my said prior patent, a flat strip of metal 20 is punched to provide the basic ring structure of Fig. 4, or in the modification of Fig. 6 a similar flat strip of metal 20a is punched. In either showing, the strip of metal is of length sufficient for forming a complete ring when all of the folding and bending operations are completed. In both constructions, the punching operation provides a number of sections 21 which include each a rear wall or back panel portion 22 and a pair of sectors or crowns 23 at the top and bottom of the back panel portion. The sections 21 are connected at their ends by loop sections 24, and for convenience the continuous metal formation composed of said back panel portions and loop sections will be referred to as the spine, it being noted that the sectors or crowns emanate laterally from the spine in general similitude to ribs but each having a dimension lengthwise of the spine at least as great as the dimension thereof perpendicular to the spine. In the following description, the outer edges of the rib-like sectors paralleling the spine will be referred to as the side edges of the sectors and the edges transverse to the spine will be referred to as the end edges of the sectors. The sectors preferably provide a slight arcuate curvature to the side edge thereof in order that each may conform to the curvature of the cylinder wall with which the sector is to engage in use. The arcuate character of the side edge of the sector may be obtained by stamping it with that shape in the original punching operation or by grinding after the ring is otherwise complete. The edges of the sectors are inclined to give a rhomboidal shape to the sectors for the reason that in the subsequent formative operation upon the spine, adjacent end edges of successive sectors abut and are disposed on radial lines in the completed ring, as indicated in Fig. 1. The several successive sectors next the top of the completed ring constitute an annular upper ledge with the several side edges combining to form an oil-wiping cylinder-engaging edge, and similarly the several successive sectors next the bottom of the completed ring constitute an annular lower ledge parallel to and spaced from the upper ledge and also combining to form an oil-wiping cylinder-engaging edge.

It will be understood that in order to position the sectors in proper and parallel planes, said sectors are bent or folded as shown in Figures 8–12, to lie in planes perpendicular to the plane of the spine, which for convenience may be referred to as vertical, giving a U-shaped cross-section in a radial plane to the sections 21, and that the loop sections 24 are looped radially outward to bring the sectors together. The looping is done in two steps, the general form of loop being first formed with the series of sectors in a line but still partly separated, as shown in Fig. 10 and at the left of Fig. 12, and the loop thereafter pressed closer together next the ends of the loops nearest the sections thereby bringing the end edges of successive sectors into contiguous relation as shown at the right of Fig. 12, and as shown in Figures 1, 2 and 3, accentuating the loop formation. For convenient reference to parts of the loop, the mentioned ends thereof nearest the sections may be termed the basal portion of each loop, whereas the midportion between said ends which bulges to proximity of the arcuate or oil-wiping side edge of the sector may be termed the head of the loop. The loops are stiffly resilient and provide the ring tension.

A feature contemplated by the present invention is provision of an oil pocket or chamber with controlled oil escape therefrom, and such a pocket or chamber is provided in the region defined by loops at opposite ends of each section and by the upper and lower crowns, or portions thereof which extend from one loop to the next in the annular series. The spine is so constructed and arranged that extended lengths thereof are, in folded condition of spine and sectors, spaced from th planes of one or both of the ledges, thereby providing slots for oil passage. First describing the showing of Figs. 4, 5 and 9, it will be observed that the spine portions between sectors or crowns on the upper edge provide edges which, for their entire lengths, are in a single plane. Thus when the sectors are folded down and the loops formed, the under faces of the sectors make surface contact with the upper edges of the said spine portions, stubby necks 25 being provided for those sectors just sufficient to accommodate the bend of the metal. But the lower edges of each spine section, provides a projecting shoulder or lug 26 midway of its length so as to be located at the head of the loop when the loop is formed. Each lower sector or crown has a long neck 27 joining it with the spine such that in addition to the length of neck needed for making the fold, there is a length of neck corresponding to the projection of lug 26 whereby the folded sector comes into surface engagement with the edge of the lug and will be supported or braced thereby next the outer edge of the ledge. There are thus provided oil escape slots 28 next the bottom ledge extending from each lug lengthwise of the ring to the long necks of the loops at opposite sides of each sector. These slots 28 permit travel or equalization of oil lengthwise of the ring and limited escape through the back of the ring. Since the slots are next the lower ledge, oil is trapped in the upper part of each pocket and makes its escape only at the bottom part of the ring. This structure is of importance in operation, because during piston upstroke it is desired to discharge as much as possible of the oil scraped from the cylinder by the ring, but on the downstroke, retention of the oil is desirable for sealing and lubricating purposes. The closed upper part of the pockets obstructs passage and tends to retain the oil on downstroke, whereas on upstroke the greatest pressure on the oil is at the bottom ledge and the oil thus escapes much more readily. This construction is of great advantage in high speed or constant speed engines, such as used in aircraft.

If, however, as with engines such as used in automobiles where the speed varies and the engine often operates at slow speed, it is desired to permit limited escape of oil on the upstroke, rings of the construction shown in Figs. 6, 7, 8 and 11 may be employed. This construction provides for the lower-edge lugs 26, long necks 27 and slots 28 next the lower ledge substantially as above described. Supplemental thereto, the upper part of the ring provides short lugs 26a opposite the long lugs, projecting upwardly from the heads of the loops, and provides necks 27a of corresponding length so the sectors or crowns when folded down provide restricted slots 28a similar to but much smaller than the above-described slots 28. Part of the oil will be trapped and part will escape on the downstroke with this ring but in much less degree of escape than on the upstroke. Since these slots 28a are very narrow, oil passage, under the developed pressure is at high velocity and keeps the slots cleaned of possible carbon deposit.

The operation of both compression and oil control rings employed with a piston in a cylinder determine the amount and disposition of oil on the cylinder wall and dilution thereof with fuel. Accordingly, in Figures 13 to 16 inclusive, I have illustrated the action transpiring in a complete cycle of piston reciprocation, but with the oil spaces and oil films greatly exaggerated for purposes of clarity. The cylinder wall is designated by numeral 29, the piston by numeral 30 and the grooves in the piston for the compression rings by numeral 31. Compression rings 32 of present-day or prior-art construction substantially fit these compression ring grooves 31 and by inherent resiliency expand outwardly into contact with the cylinder wall. Near the bottom of the piston is another or oil-control ring groove 33 and it is in this groove that the improved oil control ring 34 of the present invention is located. This ring likewise substantially fits the groove and exerts outward resilient pressure against the cylinder wall. Discharge or escape openings or drains 35 are provided from the bottom or inner periphery of the oil-control groove to the interior of the piston for discharge of collected oil from the groove.

Since the compression rings are solid, viewed in cross-section, whereas the oil control ring of the present invention is hollow, the mass of the compression ring, and therefore momentum in operation, is many times greater than the mass and momentum of the oil control ring. It has been determined that the momentum of the compression rings is sufficient to cause them to continue movement in the cylinder when the piston is brought to a stop by crank operation at dead center. Thus, in Fig. 13 the piston is illustrated as having just completed its upstroke so the piston-operating crank is at dead center, and momentum of the compression rings 32 has carried them into engagement with the upper land of the ring grooves 31. Oil 36 in the groove therefore is squeezed to the inside and underside of the ring, where it remains during downstroke illustrated in Fig. 14.

On the other hand, the oil control ring 34 does not have sufficient momentum or inertia to overcome the compressive friction with the cylinder wall, and therefore when the piston stops upward movement, the ring likewise stops, and as shown in Fig. 13, remains next the lower land of the groove 33. In this connection it may be mentioned that the oil control ring of the present invention is hardened to extreme hardness, for example 58–62 Rockwell, Scale C, whereby the wear of the ring is practically immeasurable, therefore permitting high tension or radial-expansive pressure, say in the neighborhood of 140 pounds to the square inch, to be employed as the inherent pressure of the ring against the cylinder wall. During the upstroke cycle to dead center of the piston, therefore, full amount of oil entrapped at the top of the oil groove was applied for lubrication of the cylinder with excess discharging past the ring and to drains 35. However, on the downward stroke of Fig. 14 the oil control ring is engaged by the upper land, squeezing the oil to the rear of the groove and clearance space then transfers to the bottom of the ring and groove. By virtue of the oil-scraping ledges provided by this oil-control ring, oil is scraped on both the up and down stroke into the interior of the ring and on the upstroke the greatest oil pressure is next the lower ledge and since the slots 28 are next the lower ledge, the oil is discharged readily by direct rearward flow. But on the down stroke, the oil has its greatest pressure next the top ledge, and since, by construction of Fig. 9 there is no rear opening or slot next the top ledge, and by construction of Fig. 11, a restricted slot only, the oil is pocketed within the ring to a considerable extent, approximating 50%, of the cavity of the ring, and thereby reducing the amount of oil available for lubrication of the cylinder wall on the down stroke. Inasmuch as oil left on the cylinder surface after passage of the piston on downstroke burns, carbonizes or is lost on exhaust, it is highly desirable to minimize passage of oil on the downstroke. In tests, it has been found that oil-control rings constructed as herein described with a spine closer to the upper ledge than to the lower ledge, the oil economy has greatly improved.

Figure 15:
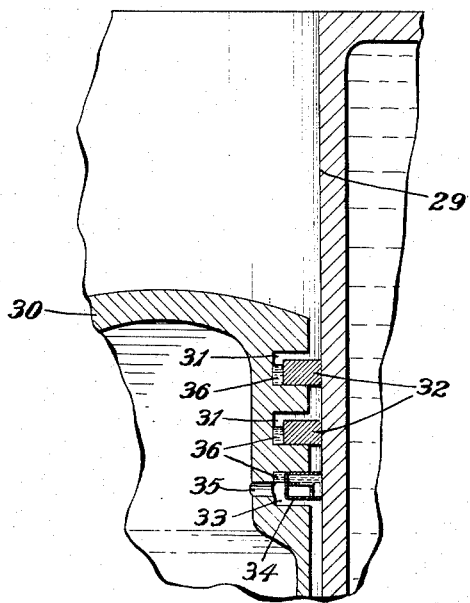
Figure 16:
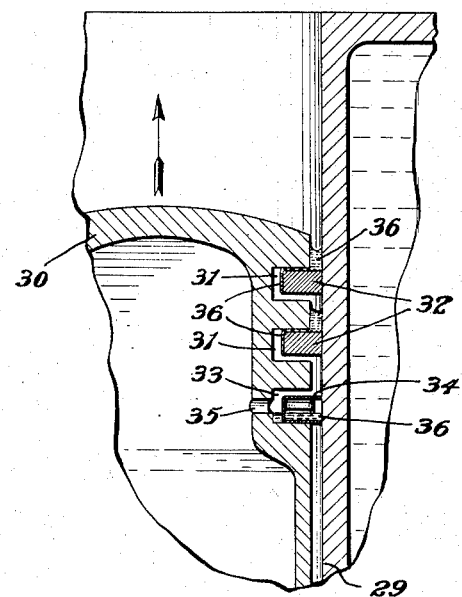
Figure 7:
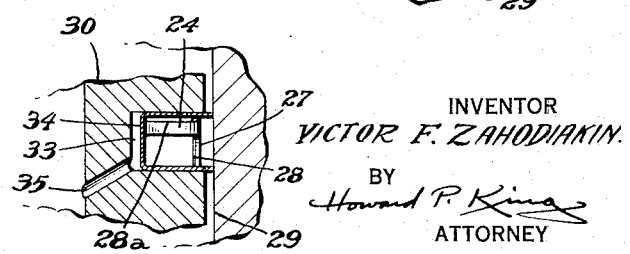
Figure 7 is a section similar to Fig. 5, showing the modified ring of Fig. 6.

Operation at the lower end of the stroke of the piston is similar to that described for the upper end of the stroke, and is shown in Figures 15 and 16. In Figure 15 with the piston at bottom dead center, the compression rings, by momentum, engage the bottom lands in their grooves, but the oil control ring moves no further than the piston so is for the moment still engaged by the upper land of its groove. As the piston starts upward, the lower land of the groove for the oil control ring comes into engagement with that ring which thereupon moves with the piston. Oil pressure developed within the hollow of the ring equalizes through the openings at the bottom of the loops circumferentially and gives maximum lubrication on the upstroke.

I claim:

1. A piston ring comprising a pair of spaced and parallel annular ledges the inner peripheries whereof are connected at intervals by integral rear walls, said ledges being radially divided substantially midway of the distance between said rear walls for constituting the ring as a circular series of sections, loops of resilient material between said ledges having height less than the distance between the ledges and spaced from both of said ledges but at unequal distances for providing narrow and wide slots between the said loops and ledges, all of the narrow slots being next one ledge and all the wide slots being next the other ledge, said loops having basal ends thereof extending from said rear walls and head ends projecting toward the outer periphery of the ledges and crossing the radial divisions thereof, and short and long lugs on the said head ends of the loops respectively of height equal to the unequal distances of the loop from said ledges, said lugs engaging and supporting the ledges next the divisions thereof and in proximity to the outer periphery thereof.

2. A flexible piston ring fabricated from a strip of resilient sheet material and consisting of a series of circumferentially arranged bent and folded sections U-shaped in radial cross-section and each providing upper and lower sectors connected at their inner edges by a vertical rear wall, and integral loops connecting successive rear walls and holding all of the upper sectors in an annular series in a common plane and all of the lower sectors in a like annular series in another and parallel plane, said loops having less height than the distance between upper and lower sectors and all situated closer to one said plane of one series of said sectors than to the plane of the other said series of sectors.

3. A flexible piston ring fabricated from a strip of resilient sheet material and consisting of a series of circumferentially arranged bent and folded sections U-shaped in radial cross-section and each providing upper and lower sectors connected at their inner edges by a vertical rear wall, and integral loops connecting successive rear walls and holding all of the upper sectors in an annular series in a common plane and all of the lower sectors in a like annular series in another and parallel plane, said loops having less height than the distance between upper and lower sectors and all situated closer to said plane of the series of the upper sectors than to the plane of said series of lower sectors.

4. A flexible piston ring fabricated from a strip of resilient sheet material and consisting of a circular spine providing therewith a circular series of bent and folded sections U-shaped in radial cross-section and each section providing upper and lower sectors connected at their inner edges by a vertical wall integral with and including a part of said spine as part of said vertical wall and with all of the upper sectors constituting an annular series in a plane and all of the lower sectors constituting a like annular series in another and parallel plane, integral loops constituted by another part of said spine and connecting successive rear walls, said loops having less height than the distance between said planes of the upper and lower sectors and all situated closer to one of said planes than the other, and each loop having a lug thereon and all of said lugs projecting from the loops to a single one of said planes and engaged by the sectors of one said series of sectors.

5. A flexible piston ring fabricated from a strip of resilient sheet material and consisting of a circular series of bent and folded sections U-shaped in radial cross-section and each providing upper and lower sectors connected at their inner edges by a vertical wall, integral loops connecting successive rear walls and holding all of the upper sectors in an annular series in a common plane and all of the lower sectors in a like annular series in another and parallel plane, said loops having less height than the distance between upper and lower sectors and situated closer to said plane of the series of the upper sectors than to the plane of said series of lower sectors, and each loop having upper and lower lugs thereon with all of the upper lugs having equal height corresponding to the spacing of the loop from the plane of the upper series of sectors and with all of the lower lugs having equal height corresponding to the spacing of the loop from the plane of the lower series of sectors, thereby providing slots between the loop and sectors extending lengthwise of the loop from the rear wall to the lug with all the slots next the upper series of sectors having less height than the slots next the lower series of sectors.

VICTOR FILIPPOVICH ZAHODIAKIN.

REFERENCES CITED

The following references are of record in the file of this patent:

UNITED STATES PATENTS

| Number | Name | Date |
|---|---|---|
| 2,293,681 | Engelhardt | Aug. 18, 1942 |
| 2,345,589 | Engelhardt | Apr. 4, 1944 |
| 2,397,636 | Zahodiakin | Apr. 2, 1946 |
| 2,432,602 | Zahodiakin | Dec. 16, 1947 |